United States Patent [19]
Mayer

[11] 3,891,230
[45] June 24, 1975

[54] WHEELED CART SUPPORTED LUGGAGE

[76] Inventor: Fred Mayer, 7080 N.W. 37th Ct., Miami, Fla. 33147

[22] Filed: Aug. 5, 1974

[21] Appl. No.: 494,468

[52] U.S. Cl....... 280/43.24; 280/47.13 R; 190/18 A
[51] Int. Cl............................................. B62d 33/08
[58] Field of Search... 280/35, 43.24, 43.1, 47.13 R, 280/79.1, 37; 190/18 R, 18 A

[56] References Cited
UNITED STATES PATENTS

| | | | |
|---|---|---|---|
| 2,472,491 | 6/1949 | Quinton | 280/37 |
| 2,925,283 | 2/1960 | Stigler | 280/37 |
| 3,057,636 | 10/1962 | D'Ettorre et al | 280/37 |

Primary Examiner—David Schonberg
Assistant Examiner—Michael J. Forman

[57] ABSTRACT

A wheeled cart in combination with a plurality of suitcases, vertically stacked thereon in a nested relation, with clamp means to lock the cart and suitcases in said relation. The suitcases are provided with pull-out drawers instead of being of the conventional clam opening type. Extendible leg means in combination with retractable wheels are provided on the underside of the cart to stabilize the assembly and to counterbalance the weight of the drawers and the articles therein when one or more of said drawers is pulled out. Therefore, a person such as a traveling salesman who moves from city to city after relatively brief stopovers can utilize the suitcases in a dresser-like manner without the problem of unpacking and packing in each locality. The suitcases and wheeled cart may readily be separated by the clamp means for storage in the trunk compartment of an automobile or for transportation on an airplane or other means of transportation.

8 Claims, 9 Drawing Figures

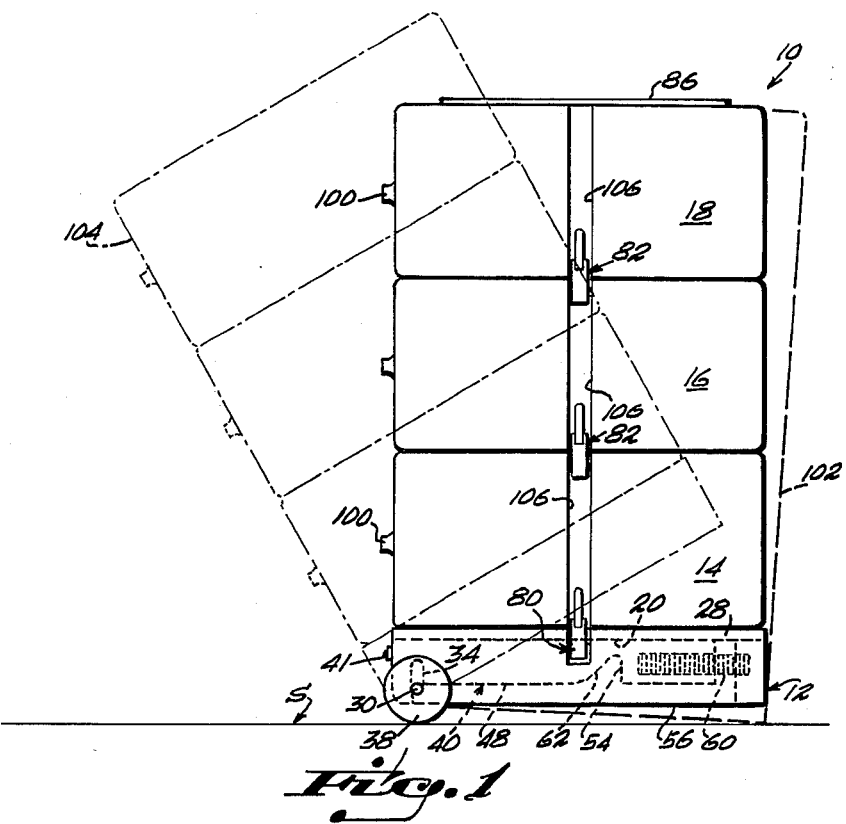
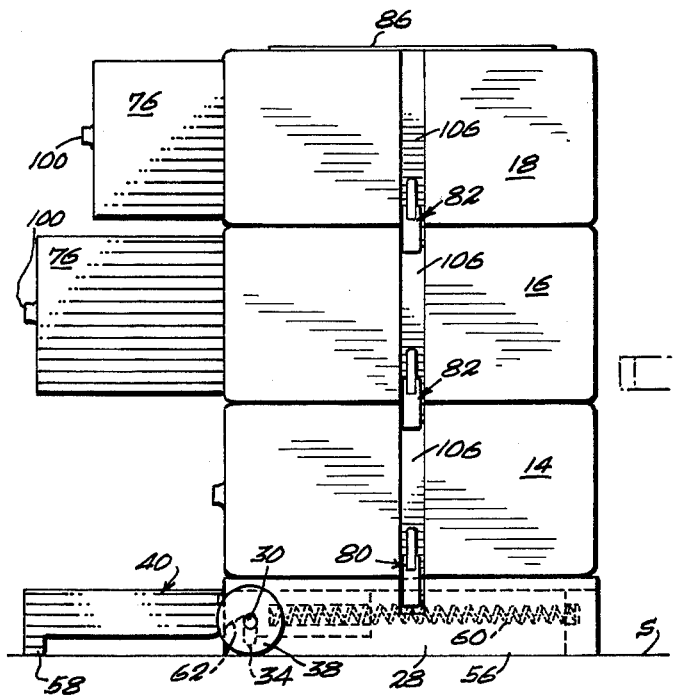
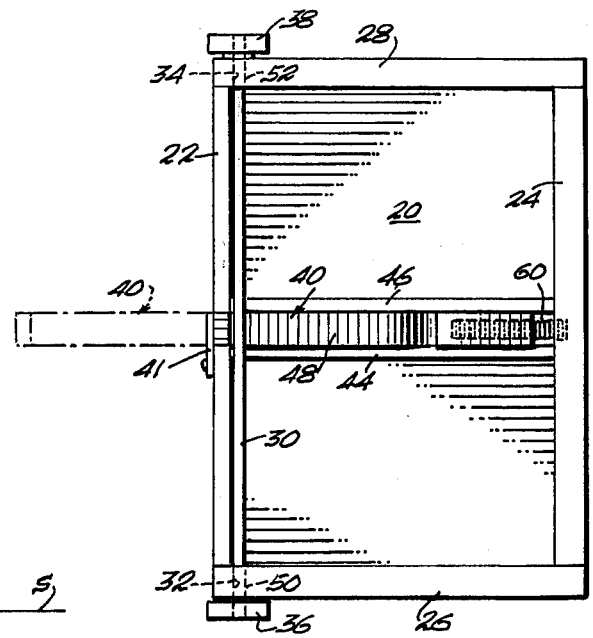

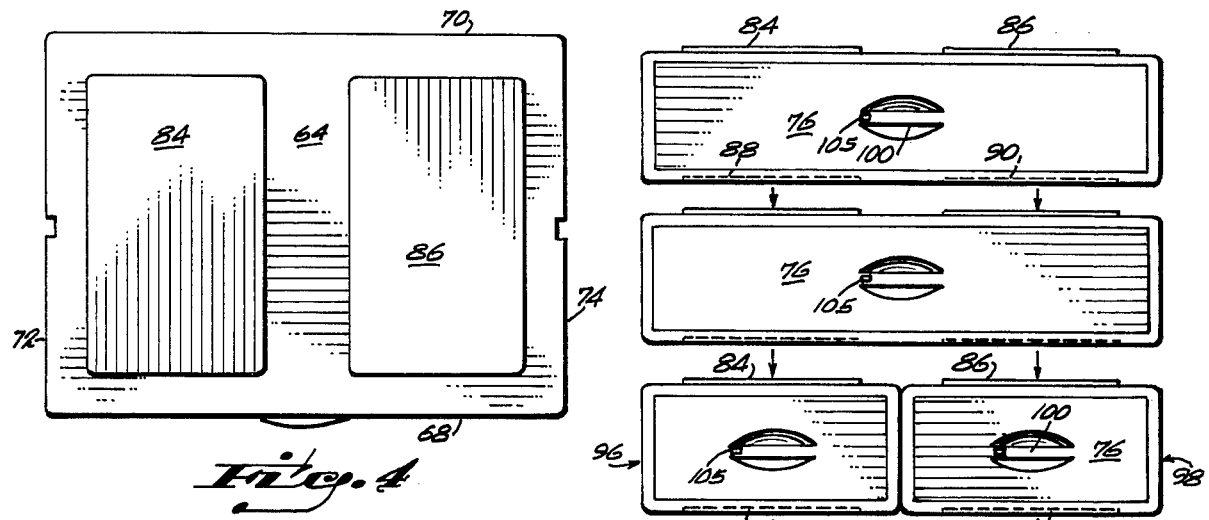
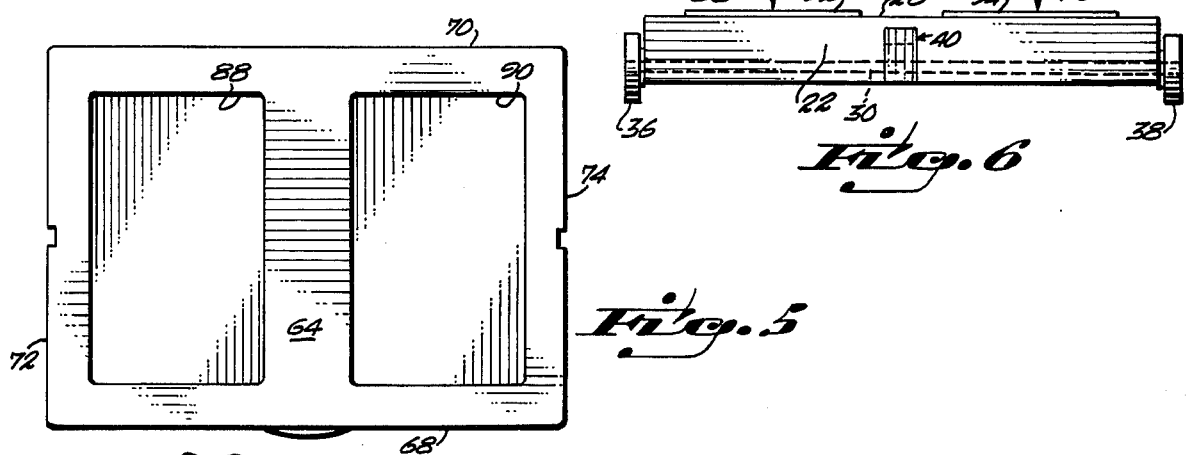
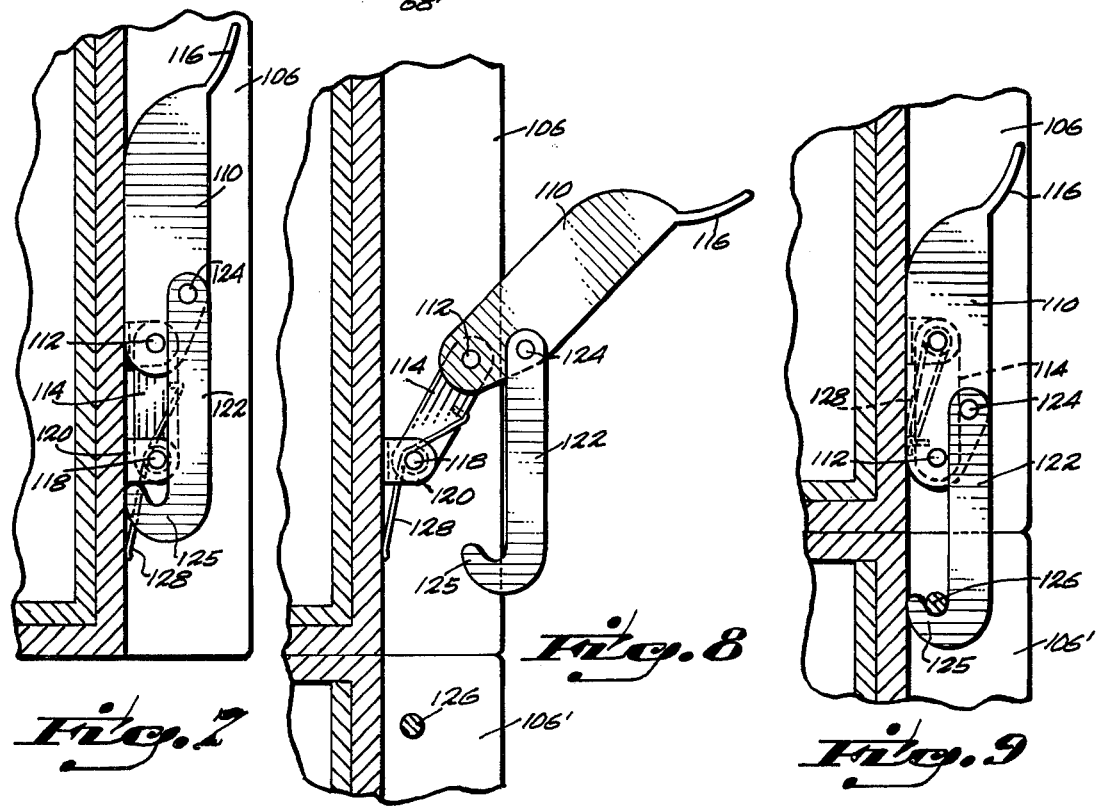

WHEELED CART SUPPORTED LUGGAGE

Field of the Present Invention

The present invention pertains to luggage in the form of a plurality of drawered suitcases which are adapted to be vertically stacked in a nested relation atop a wheeled cart including horizontally, forwardly extendible leg means to counterbalance the weight of the drawers and their contents when one or more of said drawers is withdrawn to an extended position relative to said stacked suitcases.

Objects of the Present Invention

One of the principal objects of the present invention is to provide a plurality of drawered, vertically stacked suitcases in a nested relation atop a wheeled cart providing a forwardly extendible leg means to counterbalance the weight of the drawers and their contents when one or more of said drawers is withdrawn to an extended position.

Another principal object of this invention is to provide latch means to selectively lock the stacked suitcases in their respective positions relative to each other and to the wheeled cart, or to permit separation of the respective suitcases relative to each other and the cart.

Another object of the instant invention is to provide two front wheels, mounted outboard of the cart body on a transverse axle, which coact with the extendible leg to move to a retracted position when said leg is moved to an extended position and to drop to a lowered, in use position when the leg is moved to a retracted position.

A still further object of the present invention is to provide recessed areas in the suitcases and wheeled cart to carry the latch means in a manner whereby said latches reside entirely within the outer plane of the side walls of the suitcases and wheeled cart in both the latched and unlatched positions.

BRIEF DESCRIPTION OF THE DRAWINGS

FIG. 1 is a side elevational view of the wheeled cart and stacked luggage in accordance with the present invention;

FIG. 2 is a view similar to FIG. 1, with the cart leg in an extended position and two drawers in pulled-out relation to two of the three suitcases;

FIG. 3 is a bottom plan view of the wheeled cart;

FIG. 4 is a top plan view of one of the suitcases;

FIG. 5 is a bottom plan view of one of the suitcases;

FIG. 6 is a front, exploded view of the assembly of FIG. 1; and

FIGS. 7, 8 and 9 are fragmentary sectional views illustrating the actuation of the latch means from an unlatched to a latched position.

DETAILED DESCRIPTION OF THE DRAWINGS

With reference to the drawings in which like reference characters designate like or corresponding parts throughout the various views and with particular reference to FIGS. 1 and 2, the wheeled cart and luggage, vertically stacked in a nested relation thereatop, is indicated generally at 10. The assembly is comprised of a wheeled cart 12 and a plurality of suitcases, three illustrated, 14, 16 and 18 stacked thereatop. The suitcases may be of any practical size and any number of suitcases, within practical limits, may be so stacked.

With particular reference to FIGS. 1, 2 and 3, the cart 12 is comprised generally of a top support wall 20, generally rectangularly configurated to conform with the size of the suitcases 14, 16 and 18, positioned thereon, and peripheral front, back and opposed, side walls 22, 24, 26 and 28. A transverse axle 30 spans the width of the cart, immediately inwardly of the front wall 22 and extends through vertical slots 32 and 34 in the respective side wall 26 and 28. Wheels 36 and 38 are fixed in any conventional manner to respective axle ends outwardly of the side walls 26 and 28.

A centrally disposed retractable leg 40 is longitudinally slidable in a track 42 defined by opposed side rails 44 and 46. In its retracted position the lower surface 48 of the leg 40 bottoms the axle portions 50 and 52, inwardly of the wheels 36 and 38, in the vertical slots 32 and 34 to expose said wheels for rolling engagement with a support surface S, FIG. 1. An appropriate pivotal latch means 41 normally maintains the leg 40 in the retracted position. When the leg 40 is extended as in FIG. 2, a bottom notch 54, intermediate the leg ends, aligns with the axle 30 permitting said axle to move upwardly toward the top of the vertical slots 32 and 34, freeing the wheels 36 and 38 from frictional engagement with the support surface S. The suitcase supporting cart 12 consequently rests on the bottom peripheral edge 56, defined by the front, back and side walls 22, 24, 26 and 28, and a depending foot 58 from the front end of the leg 40 engages the support surface S to stabilize the assembly for a purpose to be subsequently described. Preferably the leg 40 is spring-loaded as at 60 to permit automatic extension of said leg when the weight on the wheels 36 and 38 is relieved as by tilting the cart slightly rearwardly. The forwardly and downwardly angled front cam surface 62 of the notch 54 serves to cam the axle 30 downwardly to bottom same in the vertical slots 32 and 34 when the leg 40 is retracted, for example, under pressure applied by a foot of the user, the wheels 36 and 38 thereby being lowered to rolling engagement with the surface S as in FIG. 1.

Each suitcase 14, 16 and 18 comprises top and bottom walls 64 and 66, front and back walls 68 and 70 and opposed end walls 72 and 74. As best illustrated in FIGS. 2 and 6 a front opening drawer 76 is slidably engaged in each suitcase. The suitcases and drawers 76 may be constructed in any conventional manner of a relatively rigid material. As best seen in FIGS. 1 and 2, the lower suitcase 14 is clamped as at 80 to the cart 12 and each adjoining pair of suitcases are similarly clamped together at 82.

In addition to the clamps 80 and 82, each suitcase is provided with a pair of generally rectangular, side-by-side, upper projections 84 and 86 and companionately shaped bottom recesses 88 and 90. The to wall 20 of the cart 12 includes projections 92 and 94 similar to projections 84 and 86. As seen in FIG. 6, the projections nest in the recesses to perfectly align the cart 12 and suitcases 14, 16 and 18 in vertical assembly, the clamps 80 and 82 locking same in position. With the use of two projections and companionately shaped recesses as above described, two half size suitcases 96 and 98, FIG. 6, may be substituted for any one or more of the full size suitcases 14, 16 or 18. If all of the suitcases are to be full sized, a single large projection and companionately shaped large recess could be substituted for the pairs of projections and recesses as above described.

Each suitcase drawer 76 is provided with a centrally disposed pull 100, preferably of the recessed type. In use, the normal at rest position of the cart and suitcase assembly is indicated in broken lines at 102. For transporting the assembly, the user would tilt same forwardly as indicated in dot-dash lines at 104 and grasp the top drawer pull 100 and roll the assembly on the front wheels 36 and 38. When properly positioned for use, the assembly is tilted slightly rearwardly, permitting the spring 60 to extend the leg 40 for stabilizing purposes as previously described. If desired, the spring 60 may be omitted and the leg may be manually actuated. The drawers are automatically locked when in closed positions by any conventional type of latch means which, for example, are exteriorly operable by a button release or the like as indicated at 105, FIG. 6.

In one preferred form of the invention, the latches 80 and 82 are preferably recessed in aligned vertical grooves 106 formed in both sides of the suitcases and cart (one side illustrated), and the latches are preferably of a type which lie wholly within the recesses or grooves 106 in both the latched and unlatched positions. In FIGS. 7, 8 and 9, one preferred form of latch 80 or 82 is illustrated which includes an actuating lever 110, pivotally connected at a first end 112 to one end of a toggle link 114 and including a finger grip 116 at a second end. The opposed end of the toggle link 114 is pivoted at 118 to a yoke member 120 fixed within a groove 106, adjacent the lower end thereof. A latch link 122 is eccentrically pivoted, relative to pivot 112, to lever 110 as at 124. The lower end of the latch link 122 terminates in a jaw 125 to tightly engage about the lower portion of a pin 126, fixed horizontally across the width of a lower groove 106′, when the toggle link 114 is pivoted downwardly as seen in FIG. 9 and the actuating lever is pivoted into the upper groove 106. The toggle link 114 is spring-loaded at 128 to automatically return the entire latch assembly into a recessed position within the upper groove 106, FIG. 7, when the lever 110 is actuated to disengage the jaw 124 from the pin 106. To perform the latching engagement with the pin 126, the toggle link 114 is manually pivoted downwardly against the pressure of spring 128, which may be a torsion spring by the actuating lever 110 until the jaw 124 is below the cross pin 126. The actuating lever 110 is then pivoted upwardly about the pivot 112 into the upper groove 106, the resulting counterclockwise movement of the eccentric pivot 124 draws the jaw 124 tightly about the cross pin 126.

It should be understood that the latch assembly, above described, represents one preferred form of latching the cart and suitcases in assembly. Various other forms of latches, however, could be employed; for example, a frictional slide latch could be mounted in the upper groove 106 for sliding movement downwardly to engage in the lower groove 106′.

What is claimed is:

1. A mobile carrier and luggage for fixed, removable attachment thereatop in a stacked arrangement, the combination comprising;
   A. a cart including,
     1. a top wall,
     2. a peripheral skirt comprising depending front, back, and opposed side walls,
     3. a transverse axle spanning the width of said cart adjacent to said front wall and extending outwardly through vertical slots in said opposed side walls,
     4. a pair of front wheels fixed respectively to the opposed axle end portions, and
     5. leg means to selectively maintain said wheels in supporting engagement with a support surface or to simultaneously disengage said supporting wheel engagement and to extend substantially forwardly of said cart into engagement with said support surface to counterbalance a forwardly overbalanced condition of the luggage;
   B. a plurality of luggage carriers such as suitcases, each including
     1. front, back, top, bottom and opposed end walls defining an interior chamber,
     2. a drawer, including releasable lock means to maintain said drawer in a normally closed position slidable into and out of said interior chamber through said front wall,
     3. latch means to interconnect said cart and plurality of suitcases in a vertically aligned, stacked relation.

2. The combination as defined in claim 1 wherein said leg means to selectively maintain comprises a longitudinally extending leg, passing through an opening in said cart front wall and being movable between a retracted position between said cart top wall and said transverse axle and an extended position wherein said leg projects a substantial distance outwardly of said cart front wall.

3. The combination as defined in claim 2 wherein said leg is vertically dimensioned along its main length to engage between the underside of said cart top wall and said axle, in said retracted position, while maintaining the axle in a bottomed position relative to said vertical slots to maintain the wheels in said supporting engagement, said leg being upwardly notched in a rearward position to permit the axle to move upwardly thereinto to disengage said support wheel engagement when the leg is fully extended.

4. The combination as defined in claim 1 wherein said leg is spring-loaded to normally urge said leg toward said extended position and including means to releasably captivate said leg in a retracted position.

5. The combination as defined in claim 1 wherein said latch means to interconnect comprises a latch member, pivotally fixed relative to each sidewall of each of said suitcases, adjacent the bottom edge thereof, and a keeper means, fixed relative to each side wall of each of said suitcases and cart, adjacent the upper edge thereof, for latched engagement by said latch member.

6. The combination as defined in claim 5 wherein said latch means to interconnect is recessed in said side walls.

7. The combination as defined in claim 6 wherein each of said latch members is pivotally fixed within a first recess, through an intermediate toggle link, whereby each of said latch members may be selectively, manually extended into latched engagement with a keeper means such as a cross pin, fixed within a second recess, or into an unlatched position wholly within said first recess.

8. The combination as defined in claim 7 including torsion spring means to automatically return said latch member to said position within said first recess when said latch member is manually disengaged from said keeper pin.

* * * * *